United States Patent Office 3,524,842
Patented Aug. 18, 1970

3,524,842
WATER-SOLUBLE CATIONIC PHENYLAZO-
NAPHTHOL DYESTUFFS CONTAINING A
QUATERNARY AMMONIUM GROUP
Hans Grossmann, Oberwil, and Heinz Keller, Muttenz, Switzerland, assignors to Durand & Huguenin A.G., Basel, Switzerland
No Drawing. Filed Aug. 4, 1967, Ser. No. 658,333
Int. Cl. C09b 29/28; D06p 1/02; A61k 7/12
U.S. Cl. 260—151
5 Claims

ABSTRACT OF THE DISCLOSURE

Compounds of the formula z—A—N=N—B—L$_{m-1}$—Q$^+$X$^-$ in which A represents a 1,4-phenylene residue, a 1,4- or 2,6-naphthylene residue or a 4,4'-diphenylene residue, B represents the residue of a coupling component that contains a hydroxyl group in ortho-position or α-position to the azo-bridge, z represents a primary, secondary or tertiary amino group, L represents a divalent bridge member, m is the whole number 1 or 2, Q$^+$ represents a quarternary ammonium group, and X$^-$ represents an anion that imparts solubility in water, and which contain no further acid groups capable of dissociating, are particularly useful in dyeing pelts, animal or human hair, and especially living human hair. Living human hair is dyed uniformly and at room temperature without dyeing the skin when these dyestuffs are utilized. They are also suitable for dyeing textile fibers and goods.

This invention relates to new, water-soluble, cationic monoazo-dyestuffs, a process for their manufacture, and a process for dyeing living human hair with the said dyestuffs.

The dyestuffs of the present invention correspond to the general formula z—A—N=N—B—L$_{m-1}$Q$^+$X$^-$   I in which A represents a 1,4-phenylene residue, a 1,4- or 2,6-naphthylene residue or a 4,4'-diphenylene residue, B represents the residue of a coupling component that contains a hydroxyl group in ortho-position or α-position to the azo-bridge, z represents a primary, secondary or tertiary amino group, L represents a divalent bridge member, m is the whole number 1 or 2, Q$^+$ represents a quarternary ammonium group, and X$^-$ represents an anion that imparts solubility in water, and the dyestuffs of the above formula contain no further acid groups capable of dissociating.

The residue A is preferably a 1,4-phenylene, but may be a 1,4- or 2,6-naphthylene or 4,4'-diphenylene, residue which may contain substituents customary in dyestuff chemistry, such as nitro, acylamino, alkyl or alkoxy groups or halogen atoms, but are free from acid groups capable of dissociating.

The bridge member L may be, for example,

—SO$_2$CH$_2$—,

—COCH$_2$—,   —SO$_2$CH$_2$CH$_2$—,   —SO$_2$NH(CH$_2$)$_2$—,
—SO$_2$NH(CH$_2$)$_3$—,   —CONH(CH$_2$)$_3$—,

—NHCOCH$_2$CH$_2$—,

—NHCOCH$_2$—,   —CH$_2$NHCOCH$_2$—   or   —CH$_2$—.   As defined above m is the whole number 1 or 2. Those dyestuffs are preferred in which m is the whole number 1, namely those in which the quaternary ammonium group is bound directly to the aromatic portion of the coupling component.

As Q$^+$ there is to be understood a quarternary ammonium group of the formula

in which $x_1$, $x_2$ and $x_3$ each represent a lower hydroxyalkyl, cyanoalkyl, aralkyl, halogen-alkyl, cycloalkyl or especially a lower alkyl group, or two or three of these symbols together with the nitrogen atom to which they are bound form a monocyclic heterocyclic residue, for example, a pyridine, piperidine or morpholine ring.

As primary, secondary or tertiary amino group z there may be mentioned those of the formula

R$_1$R$_2$N— in which R$_1$ represents a hydrogen atom or a lower alkyl, lower hydroxyalkyl, aryl, aralkyl or cycloalkyl group, and R$_2$ represents a hydrogen atom or a lower alkyl or lower hydroxyalkyl group, or R$_1$ and R$_2$ together with the ntirogen atom form a heterocyclic ring.

Groups of this kind are, for example, NH$_2$—,

CH$_3$NH—,

C$_2$H$_5$NH—, C$_4$H$_9$NH—, HOCH$_2$CH$_2$NH—, C$_6$H$_5$NH—,
C$_6$H$_5$CH$_2$NH—, C$_6$H$_{11}$NH—, (CH$_3$)$_2$N—, (CH$_3$)(C$_2$H$_5$)N—, (HOCH$_2$CH$_2$)$_2$N—, (HOCH$_2$CH$_2$)(C$_2$H$_5$)N—, (C$_6$H$_5$CH$_2$)(C$_2$H$_5$)N—, and N-piperidyl and N-morpholinyl groups.

As coupling components there may be mentioned more especially compounds of the acetoacetylarylamide and the 1-phenyl-3-methyl-5-pyrazolone series and phenols or naphthols that couple in ortho-position to the hydroxyl group, and which compounds are free from further acid groups capable of dissociating.

The anion X$^-$ that imparts solubility in water may be of inorganic or organic character, such, for example, as Cl$^-$, Br$^-$, ClO$_4$$^-$, CH$_3$OSO$_3$$^-$, CH$_3$C$_6$H$_4$SO$_3$$^-$ or ZnCl$_3$$^-$, The dyestuffs of the Formula I can be made by various methods that are in themselves known. Thus, for example, one molecular proportion of a diazonium compound of the formula z—A—$\overset{+}{N}$≡N   II in which z and X$^-$ have the meanings given above, is coupled, advantageously in an aqueous medium and in the presence of an agent capable of binding mineral acid, with a coupling component that couples in ortho-position to a hydroxyl group and corresponds to the formula HBL$_{m-1}$—Q$^+$ X$^-$   III in which B, L, m, Q$^+$ and X$^-$ have the meanings given above.

The diazonium compounds of the Formula II can in many cases be obtained by the direct reaction of one molecular proportion of nitrous acid with one molecular proportion of the appropriate amine. This is especially the case when the group z is a secondary or tertiary amino group. It is often possible, however, to diazotise primary diamines directly on one side, for example, in the case of ortho-nitro- or ortho-halogen-para-phenylene diamines and 4,4'-diamino-diphenyls. Diazonium compounds of the Formula II can also be obtained by the hydrolytic splitting of acyl-amino-diazonium salts, for example, 4'-acetylamino-benzene diazonium chloride. In the case of compounds, in which z represents a secondary amino group, it is often of advantage to react them with two molecular proportions of nitrous acid, in order to enhance the coupling power of the diazonium group by introducing a nitroso group into the secondary amino group. After the coupling, the nitroso group can easily be split off by reduction or hydrolysis.

When the selective action of the nitrous acid on the diamine cannot be brought about satisfactorily, it is of advantage to protect temporarily the amino group that is not to enter into reaction. This can be achieved, for example, by the formation of a sulphamic acid or by introducing an acyl group, such as the formyl, acetyl or oxalyl group. After the coupling to form the monoazo-dyestuff, these groups can be split off by hydrolysis.

Another process for making the dyestuffs of the Formula I consists in coupling a diazonium compound of the formula

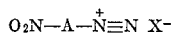

$$O_2N-A-\overset{+}{N}\equiv N \ X^-$$

with a compound of the Formula III, and then reacting the resulting product with a reducing agent, for example, sulphide-ions, capable of reducing the nitro group to an amino group.

In a few cases it is possible to introduce the quaternary ammonium group after the coupling reaction, for example, by reacting a monoazo-dyestuff, that contains a reactive halogen atom, with a tertiary amine, or by acylating a monoazo-dyestuff, which contains, in addition to a tertiary amino group, a primary or secondary amino group, with an acylating agent containing a quaternary amino group, such, for example, as an acid chloride of betaine.

The dyestuffs produced in accordance with the invention can be isolated and purified by methods in themselves known. In the case of very readily water-soluble dyestuffs it is often desirable to convert them into a sparingly water-soluble salt, for example, into a perchlorate or a heavy metal double salt, especially a zinc chloride double salt.

The dyestuffs of this invention are of particular interest for dyeing pelts, animal or human hair, and especially living human hair. Aqueous solutions of dyestuffs of the Formula I are capable of uniformly dyeing hair, owing to their high affinity, without any assistant even at room temperature.

A further advantage of the dyestuffs of the invention is that they do not dye, or only slightly dye, the skin. Their affinity is hardly affected at all by the pH-value of the solution. For practical reasons dyeing solutions having a pH-value within the range of from 4.5 to 9.5 are preferred. The solutions are stable to storage. The dyestuffs can be incorporated without impairing their affinity in shampoos, creams, jellies or pastes. Aqueous solutions of the dyestuffs may, if desired, contain the usual pH-regulating substances, organic solvents, such as alcohol, thickening agents, resins, wetting agents or detergents, perfume oils or agents for the care of the hair.

By mixing together two or more dyestuffs of the Formula I a wide range of tints can be produced. Even in dyeing nonhomogeneous hair no separation into the individual components occurs, so that under all conditions uniform dyeings are produced. The dyeings are substantially fast to rubbing, water, washing and light, and they are resistant to permanent deforming agents, such as thioglycolic acid.

The water-soluble dyestuffs of the Formula I are also suitable for dyeing textile structures, such fibres, flocks, filaments, spun goods, woven and knitted fabrics, of mordanted, for example, tanned, cotton, natural polyamides, such as wool or silk, and synthetic polyamides. The dyestuffs are especially suitable for dyeing polymers or copolymers of acrylonitrile and dicyanethylene.

The following examples illustrate the invention, the parts and percentages being by weight unless otherwise stated:

EXAMPLE 1

15 parts of para-aminoacetanilide were dissolved in 100 parts of water and 28 parts of hydrochloric acid of 33% strength, and diazotised at 0° C. with 6.9 parts of sodium nitrite (in the form of a solution of 30% strength). After neutralising the excess of hydrochloric acid with sodium bicarbonate, the diazonium solution was mixed with an ice-cold solution of 21.9 parts 7-trimethylammonio-2-naphthol hydroxide (as neutral salt) in 120 parts of water, and sufficient caustic soda solution of 30% strength was run in to give a constant pH-value of 6.5. When the coupling had terminated, the monoazo-dyestuff was precipitated with sodium chloride and filtered off. The residue was boiled for 4 hours in 500 parts by volume of 1 N-sulphuric acid under reflux. The dyestuff was precipitated by adding sodium chloride, and then filtered off and dried.

The dyestuff so obtained corresponds to the formula

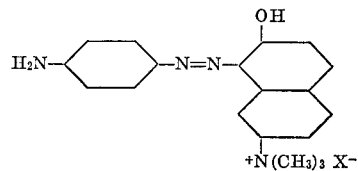

and dissolves in water to give a brownish red colour and in concentrated sulphuric acid to give a brownish orange colour.

The same dyestuff can be obtained by diazotising para-nitraniline, coupling the diazo-compound as described above, and reducing the nitro-azo-dyestuff with ammonium sulphide.

The dyestuff dyes a fabric of polyacrylonitrile deep brown tints from an acetic acid bath.

2 parts of this dyestuff are dissolved in 1000 parts of water with the addition of ammonia to give a pH-value of 9. Natural grey human hair was treated with this solution at 25° C. for 25 minutes. After washing the hair with a cation-active wetting agent and rising it, there was obtained a uniform brown colour that was first to light, washing and permanent waving.

The same result was obtained by using a neutral or weakly acid solution of the dyestuff.

A solution of 0.5 part of this dyestuff in 50 parts of water was stirred into a mixture of 30 parts of a fatty alcohol-ethylene oxide addition product, 15 parts of paraffin oil, 5 parts of vaseline and 5 parts of fatty alcohol. The resulting paste was applied to bleached hair and allowed to act for 30 minutes at 25° C. to 30° C. There was obtained a brown dyeing.

A mixture consisting of 2 parts of the dyestuff of this example, 15 parts of a vinylpyrrolidone-vinylacetate copolymer (ratio 50:50), 200 parts of isopropanol and 783 parts of water is applied to natural grey hair. The hair is dried and combed. In this way a strong brown, semipermanent dyeing is obtained.

EXAMPLE 2

15.3 parts of ortho-nitro-para-phenylene diamine were dissolved hot in 80 parts of water and 28 parts of hydrochloric acid of 33% strength, and, after cooling the solution to 25° C., 80 parts of ice were added. By adding dropwise an aqueous solution of 30% strength of 6.9 parts of sodium nitrite the diamine was diazotised on one side. The diazonium solution was added at 0–5° C. to a neutral solution of 23.6 parts of 4-(acetoacetyl-amino)-phenyl-trimethylammonium hydroxide (as neutral salt) in 120 parts of water, and then sodium acetate was added in portions until the acid reaction to Congo disappeared. After the coupling had terminated, the monoazodyestuff was precipitated with sodium chloride, filtered off and dried.

The dyestuff so obtained corresponds to the formula

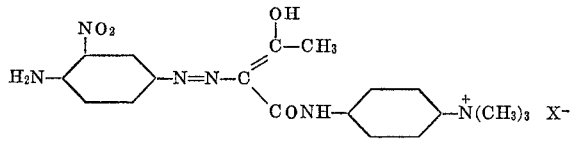

It dissolves in water to give a brownish orange colour and in concentrated sulphuric acid to give a brownish yellow colour.

By the procedure described in Example 1 there was obtained with this dyestuff on natural grey hair a uniform red-orange tint that is fast to light and washing.

The coupling component used in this example was obtained by condensing diketene with 4-aminophenyl-trimethylammonium chloride.

EXAMPLE 3

18.4 parts of 4,4'-diaminodiphenyl were dissolved hot in 500 parts of water with hydrochloric acid of 33% strength at a reaction closely acid to Congo. After the addition of 6.0 parts of acetic acid of 100% strength, there were added dropwise at 10 to 15° C. an aqueous solution of 6.9 parts of sodium nitrite. The precipitated product was filtered off, and then stirred in 150 parts of water and 28 parts of hydrochloric acid of 33% strength at room temperature for 20 hours. After introducing 10 parts of sodium bicarbonate, the solution of the amino-diazonium compound was run at 6–10° C. into a solution of 34 parts of 3-(2-hydroxy-naphthyl-6'-sulphonyl - amino) - propyl-trimethylamonium hydroxide (as neutral salt) and 20 parts of sodium carbonate in 200 parts of water. When the coupling had terminated, the monoazo-dyestuff was filtered off and dried.

The dyestuff so obtained corresponds to the formula

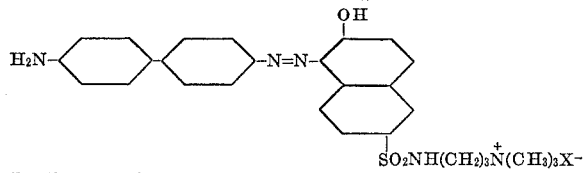

It dissolves in water to give a brown-violet colour and in concentrated sulphuric acid to give a violet colour, and it dyes grey hair red-violet tints.

The coupling component used in this example was obtained by reacting 2-hydroxy-1-naphthoic acid with chlorosulphonic acid, condensing the resulting sulpho-chloride with 3-dimethylamino-propylamine, hydrolytic splitting of the carboxyl group, and quaternating the product with dimethyl sulphate in an aqueous suspension rendered alkaline with bicarbonate.

EXAMPLE 4

16.4 parts of N-acetyl-N-methyl-para-phenylene diamine were diazotised in a manner analogous to that described in Example 1, and the diazo-solution was added at 0–5° C. to a solution of 18.3 parts of ortho-trimethyl-ammonio-para-cresol hydroxide (as neutral salt) and 25 parts of sodium carbonate in 300 parts of water. When the coupling had terminated, the reaction mixture was neutralised with sulphuric acid of 50% strength, and rendered strongly acid with 100 parts of sulphuric acid of 50% strength. The solution was boiled under reflux for 2 hours, and then neutralised with caustic soda solution. By the addition of sodium chloride the dyestuff was precipitated, and then it was filtered off and dried.

The dyestuff so obtained corresponds to the formula

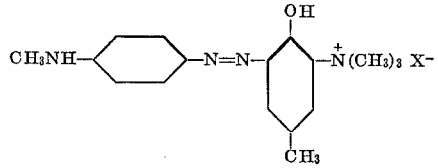

It dissolves in water to give a yellow-brown colour and in concentrated sulphuric acid to give a brown-red colour, and it dyes human hair yellow-brown tints by the procedure described in Example 1.

EXAMPLE 5

38.8 parts of the disodium salt of 4-amino-diphenyl-amine-N,N'-disulphonic acid were dissolved in 150 parts of water, the solution was rendered acid to Congo with 40 parts of hydrochloric acid of 33% strength and 6.9 parts of sodium nitrite were added for diazotisation. The precipitated diazonium compound was filtered off, and introduced into a solution of 24.9 parts of 1-(3'-trimethylam-monio-phenyl)-3-methyl-5-pyrazolone (as neutral salt) and 25 parts of sodium acetate in 250 parts of water at room temperature. When the coupling had terminated, the whole was rendered strongly acid to Congo with sulphuric acid of 50% strength, and the splitting up of the sulphamic acid was completed by heating. After neutralising the solution, the precipitated dyestuff was filtered off and dried.

The dyestuff so obtained corresponds to the formula

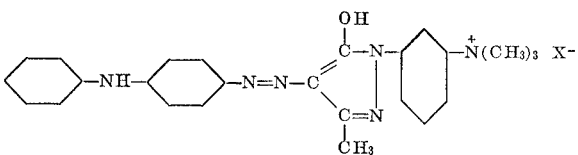

It dissolves in water to give a brownish red colour and in concentrated sulphuric acid to give a greenish yellow colour, and it dyes grey human hair red-violet tints.

EXAMPLE 6

19.5 parts of 4-amino-3-nitro-acetanilide were diazotised in the usual manner. The diazonium solution was mixed at 10° C. with a solution of 21.9 parts of 7-trimethylammonio-2-naphthol hydroxide (as neutral salt) and 25 parts of sodium carbonate in 300 parts of water. When the coupling had terminated, the precipitated dyestuff was filtered off, and then boiled under reflux in 500 parts of sulphuric acid of 10% strength until the acetyl group had completely split off. Sodium acetate was then added until the acid reaction to Congo had disappeared. The precipitated dyestuff was filtered off, washed and dried.

The dyestuff so obtained corresponds to the formula

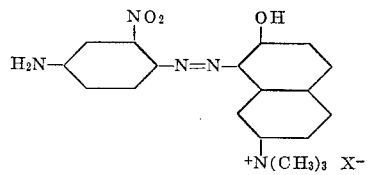

It dissolves in water to give a red-violet colour and in concentrated sulphuric acid to give a bluish red colour, and it dyes grey human hair red-violet tints by the procedure described in Example 1.

EXAMPLE 7

40 parts of the monoazo-dyestuff obtained from diazotised 4-amino-3-nitro-benzene and 1-chloracetylamino-7-naphthol were introduced into 500 parts of water and 500 parts of pyridine. The mixture was stirred for 2 hours at room temperature and for a further 2 hours at 85–90° C. After distilling off the pyridine and diluting the residue with water, the dyestuff was precipitated with sodium chloride, filtered off and dried.

The dyestuff so obtained corresponds to the formula

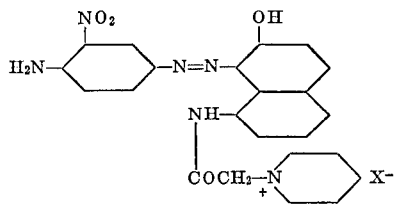

It dissolves in water to give a yellow-brown colour and in concentrated sulphuric acid to give a red-orange colour, and it dyes natural grey human hair yellow-brown tints by the procedure described in Example 1.

EXAMPLE 8

16 parts of N,N-diethyl-para-phenylene diamine were diazotised with 6.9 parts of sodium nitrite in the usual manner in 150 parts of water and 28 parts of hydrochloric acid of 33% strength. After neutralising the excess of hydrochloric acid with sodium bicarbonate, the diazonium solution was run slowly into a solution of 27.6 parts of 7 - trimethylammonio-acetylamino-2-naphthol hydroxide (as neutral salt) and 15 parts of sodium bicarbonate in 250 parts of water. The dyestuff was precipitated in the usual manner, filtered off and dried.

The dyestuff so obtained corresponds to the formula

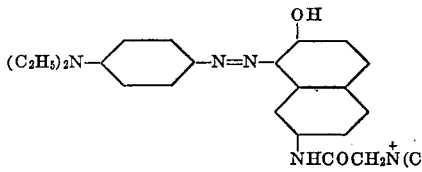

It dissolves in water to give a violet colour and in concentrated sulphuric acid to give an orange colour, and it dyes bleached human hair red tints by the procedure described in Example 1.

The same dyestuff was obtained by acylating with the acid chloride of betaine the monoazo-dyestuff obtained from diazotised N,N-diethyl-para-phenylene diamine and 2,7-aminonaphthol.

In the following table are given further examples of dyestuffs of the Formula I which were obtained by the methods described in the foregoing examples.

TABLE

| Example | Dyestuff | Tint on grey human hair |
|---|---|---|
| 9 | (CH₃)₂N—⟨⟩—N=N—C(OH)(CH₃)—CONH—⟨⟩—N⁺(CH₃)₃ X⁻ | Red-orange. |
| 10 | H₂N—⟨NO₂⟩—N=N—C(OH)(CH₃)—CONH—(CH₂)₃N⁺(CH₃)₃ X⁻ | Red-orange. |
| 11 | H₂N—⟨Cl⟩—N=N—C=C(OH)—N—⟨⟩—N⁺(CH₃)₃ X⁻ (C=N, CH₃) | Orange. |
| 12 | (C₂H₅)₂N—⟨CH₃⟩—N=N—C=C(OH)—N—⟨⟩—N⁺(CH₃)₃ X⁻ (C=N, CH₃) | Violet. |
| 13 | H₂N—⟨⟩—N=N—⟨OH, CH₃, ⁺N(C₂H₅)₃ X⁻⟩ | Brownish yellow. |
| 14 | (C₂H₅)₂N—⟨⟩—N=N—⟨OH, CH₃⟩—N⁺(CH₃)₃ X⁻ | Red-brown. |

| Example | Dyestuff | Tint on grey human hair |
|---|---|---|
| 15 | $H_2N-\text{C}_6H_3(NO_2)-N=N-\text{naphthyl}(OH)-CH_2N^+(CH_3)_3 \; X^-$ | Yellow-brown. |
| 16 | $H_2N-\text{C}_6H_3(NO_2)-N=N-\text{naphthyl}(OH)-N^+(CH_3)_3 \; X^-$ | Yellow-brown. |
| 17 | $H_2N-\text{C}_6H_3(NO_2)-N=N-\text{naphthyl}(OH)-NH-COCH_2-N^+(CH_3)_3 \; X^-$ | Yellow-brown. |
| 18 | $(HOCH_2CH_2)(CH_3)N-\text{C}_6H_4-N=N-\text{naphthyl}(OH)-{}^+N(CH_3)_3 \; X^-$ | Brown-red. |
| 19 | $CH_3NH-\text{C}_6H_4-N=N-\text{naphthyl}(OH)-{}^+N(CH_3)_3 \; X^-$ | Red-brown. |
| 20 | $\text{C}_6H_{11}-CH_2NH-\text{C}_6H_4-N=N-\text{naphthyl}(OH)-{}^+N(CH_3)_3 \; X^-$ | Red-brown. |
| 21 | $(CH_3)_2N-\text{C}_6H_4-N=N-\text{naphthyl}(OH)-NH-COCH_2-N^+(\text{morpholino})-CH_3 \; X^-$ | Brown-red. |
| 22 | $H_2N-\text{naphthyl}-N=N-\text{naphthyl}(OH)-{}^+N(CH_3)_3 \; X^-$ | Brown. |
| 23 | $(CH_3)_2N-\text{C}_6H_4-N=N-\text{naphthyl}(OH)-NHCOCHC_2{}^+N_2(H_4OH)_3 \; X^-$ | Brown-red. |

| Example | Dyestuff | Tint on grey human hair |
|---|---|---|
| 24 | 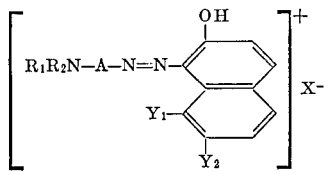 | Blue violet. |
| 25 | 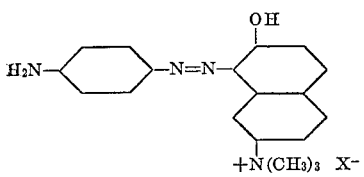 | Red. |

What we claim is:

1. A water-soluble cationic monoazo-dyestuff of the formula

wherein
$R_1$ is hydrogen, methyl, ethyl or hydroxyethyl,
$R_2$ is hydrogen, methyl or ethyl,
A is 1,4-phenylene, 2-nitro-1,4-phenylene, 2-methyl-1,4-phenylene, or 2,5-dimethoxy-1,4-phenylene,
$Y_1$ is hydrogen or trimethylamino,
$Y_2$ is hydrogen or trimethylamino and
$X^-$ is an anion which imparts solubility in water, with the proviso that $Y_1$ and $Y_2$ represent groups different from each other.

2. A cationic monoazo-dyestuff according to claim 1 wherein $X^-$ is $Cl^-$, $Br^-$, $ClO_4^-$, $CH_3OSO_3^-$ $$CH_3C_6H_4SO_3^-$$

or $ZnCl_3^-$.

3. A cationic monoazo-dyestuff of the formula wherein $X^-$ is an anion which imparts solubility in water.

4. A cationic monoazo-dyestuff of the formula

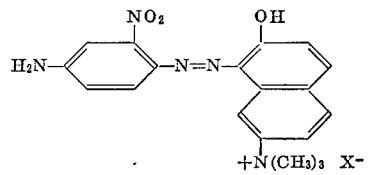

wherein $X^-$ is an anion which imparts solubility in water.

5. A cationic monoazo-dyestuff of the formula

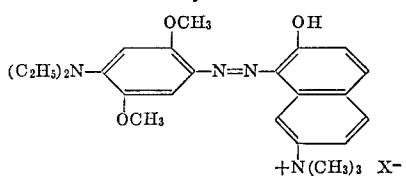

wherein $X^-$ is an anion which imparts solubility in water.

References Cited

UNITED STATES PATENTS

| | | | |
|---|---|---|---|
| 2,154,838 | 4/1939 | Fischer et al. | 260—198 |
| 3,148,181 | 9/1964 | Wallace et al. | 260—178 XR |
| 3,170,910 | 2/1965 | Neracher et al. | 260—206 XR |
| 3,252,964 | 5/1966 | Fuchs et al. | 260—152 |
| 3,403,143 | 9/1968 | Ramanothan | 260—158 |
| 3,454,552 | 7/1969 | Yamaya et al. | 260—206 XR |

FLOYD D. HIGEL, Primary Examiner

U.S. Cl. X.R.

8—10, 10.1, 41, 42, 43, 50; 117—138.8, 141, 144; 260—37, 41, 152, 156, 162, 163, 193, 195, 197, 198, 199, 206, 562; 424—70